United States Patent
Uniyal et al.

(10) Patent No.: US 12,061,860 B2
(45) Date of Patent: Aug. 13, 2024

(54) UNIFORM HIERARCHICAL VIEW OVER DIVERSE DATA FORMATS

(71) Applicant: SAP SE, Walldorf (DE)

(72) Inventors: Ajay Krishna Uniyal, Bangalore (IN); Leena Khatri, Bangalore (IN); Shivendra Kumar Mathur, Bangalore (IN); Aditya Karanth, Bangalore (IN); Kalyan Chakravarthy Nannapaneni, Bangalore (IN); Sampathkumar S, Bangalore (IN); Trimurthulu Kondepudi, Bangalore (IN)

(73) Assignee: SAP SE, Walldorf (DE)

( * ) Notice: Subject to any disclaimer, the term of this patent is extended or adjusted under 35 U.S.C. 154(b) by 66 days.

(21) Appl. No.: 17/498,490

(22) Filed: Oct. 11, 2021

(65) Prior Publication Data

US 2023/0111193 A1 Apr. 13, 2023

(51) Int. Cl.
*G06F 17/00* (2019.01)
*G06F 16/93* (2019.01)
*G06F 40/134* (2020.01)
*G06F 40/137* (2020.01)
*G06F 40/174* (2020.01)

(52) U.S. Cl.
CPC ........... *G06F 40/137* (2020.01); *G06F 16/93* (2019.01); *G06F 40/134* (2020.01); *G06F 40/174* (2020.01)

(58) Field of Classification Search
None
See application file for complete search history.

(56) References Cited

U.S. PATENT DOCUMENTS

| | | | | |
|---|---|---|---|---|
| 2003/0226116 A1* | 12/2003 | Kuwata | ................. | G06F 40/166 715/255 |
| 2006/0235871 A1* | 10/2006 | Trainor | ................... | G06F 16/38 707/999.102 |
| 2007/0130511 A1* | 6/2007 | Roberge | ................... | G06N 5/02 715/204 |
| 2007/0162840 A1* | 7/2007 | Rochelle | ............... | G06F 16/972 715/209 |
| 2008/0126402 A1* | 5/2008 | Sikchi | ................... | G06F 40/166 707/999.102 |
| 2009/0187530 A1* | 7/2009 | Nair | ........................ | G06F 16/24 707/E17.127 |

\* cited by examiner

*Primary Examiner* — Mustafa A Amin
(74) *Attorney, Agent, or Firm* — Fountainhead Law Group, PC

(57) ABSTRACT

Systems, methods, and computer-readable media are disclosed for generating uniform hierarchical views of technical documents irrespective of a file format for the technical document. Metadata definitions may be received that define a technical document hierarchy for the technical document. Based on the metadata definitions, technical data element may be mapped to the technical document hierarchy. The technical document may be generated, the technical document comprising the technical data elements. Based in part on the technical document and the metadata definitions, the uniform hierarchical view may be generated. The uniform hierarchical view may be populated with at least a subset of the technical data elements from the technical document. Once generated, the uniform hierarchical view may be displayed.

20 Claims, 4 Drawing Sheets

UNIFORM HIERARCHICAL VIEW OVER DIVERSE DATA FORMATS

TECHNICAL FIELD

Embodiments generally relate to a uniform user interface for displaying a hierarchical view over diverse data file formats. More specifically, embodiments relate to displaying technical documents in an understandable, unified user interface such that technical documents having different file formats are displayed similarly despite the different formats.

RELATED ART

A need exists for the automated generation and submission of statutory reports, such as tax documents, to legal authorities for review. Often, a subject matter expert user will want to review the statutory report prior to submitting the document to ensure its accuracy because inaccurate reports could result in substantial fines for an entity that is required to participate in a periodic statutory reporting process. However, the statutory reports are often created and submitted in various technical file formats (e.g., XML, JSON, CSV, etc.) that are difficult for even the subject matter expert user to easily read and interpret. Consequently, users often spend substantial time analyzing the statutory reports to interpret them for accuracy. Further, it can be difficult for the user to make accurate edits to the statutory reports due to the statutory reports having complex and differing syntaxes. Furthermore, statutory reports are often difficult to search. When searching a statutory report in a technical file, employees are often only able to search the data that is currently displayed on the screen and not the entirety of the data in the statutory report. Lastly, statutory reports often comprise hierarchically organized information; however, determining the hierarchy of the information is difficult when viewing the statutory report in a native technical file format.

Accordingly, a need exists for a unified hierarchical view of technical documents that allows users to view and edit data in an understandable manner irrespective of the file format of the original technical document. The unified hierarchical view should display data from technical documents having different file formats in a substantially similar manner.

SUMMARY

Disclosed embodiments address the above-mentioned problems by providing a uniform hierarchical view of technical documents across all file formats. A user may generate technical documents to send for review. The technical documents may be generated in a machine-readable manner that is difficult for a human to interpret. A uniform hierarchical view may be created from metadata displayed to the user via a graphical user interface. A user, such as an administrative user, may also provide metadata definitions defining a hierarchy of the technical document as well as mappings between source data and the data elements in the technical document. The uniform hierarchical view may be generated to be displayed in a similar manner across various file formats. Users may edit data elements in the uniform hierarchical view and have the edits written to the corresponding data elements in the technical documents. In some embodiments, the uniform hierarchical view is searchable such that the user can search large files.

A first embodiment is directed to a method of generating a uniform hierarchical view of a technical document, the method comprising receiving metadata definitions, the metadata definitions defining a technical document hierarchy for the technical document, mapping, based on the metadata definitions, technical data elements from a database to the technical document, generating the technical document, the technical document comprising the technical data elements, generating the uniform hierarchical view for the technical document, the uniform hierarchical view based in part on the technical document and the metadata definitions, populating the uniform hierarchical view with at least a subset of the technical data elements from the technical document, and causing display of the uniform hierarchical view.

A second embodiment is directed to one or more non-transitory computer-readable media storing computer-executable instructions that, when executed by a processor, perform a method of generating a uniform hierarchical view of the technical document, the method comprising receiving metadata definitions, the metadata definitions defining a technical document hierarchy for the technical document, mapping, based on the metadata definitions, technical data elements from a database to the technical document, generating the technical document, the technical document comprising the technical data elements, generating the uniform hierarchical view for the technical document, the uniform hierarchical view based in part on the technical document and the metadata definitions, populating the uniform hierarchical view with at least a subset of the technical data elements from the technical document, and causing display of the uniform hierarchical view.

A third embodiment is directed to a system for generating a uniform hierarchical view of a technical document, the system comprising a processor, a database, and one or more non-transitory computer-readable media storing computer-executable instructions that, when executed by the processor, perform a method of generating the uniform hierarchical view of the technical document, the method comprising receiving metadata definitions, the metadata definitions defining a technical document hierarchy for the technical document, mapping, based on the metadata definitions, technical data elements from a database to the technical document, generating the technical document, the technical document comprising the technical data elements, generating the uniform hierarchical view for the technical document, the uniform hierarchical view based in part on the technical document and the metadata definitions, populating the uniform hierarchical view with at least a subset of the technical data elements from the technical document, and causing display of the uniform hierarchical view.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
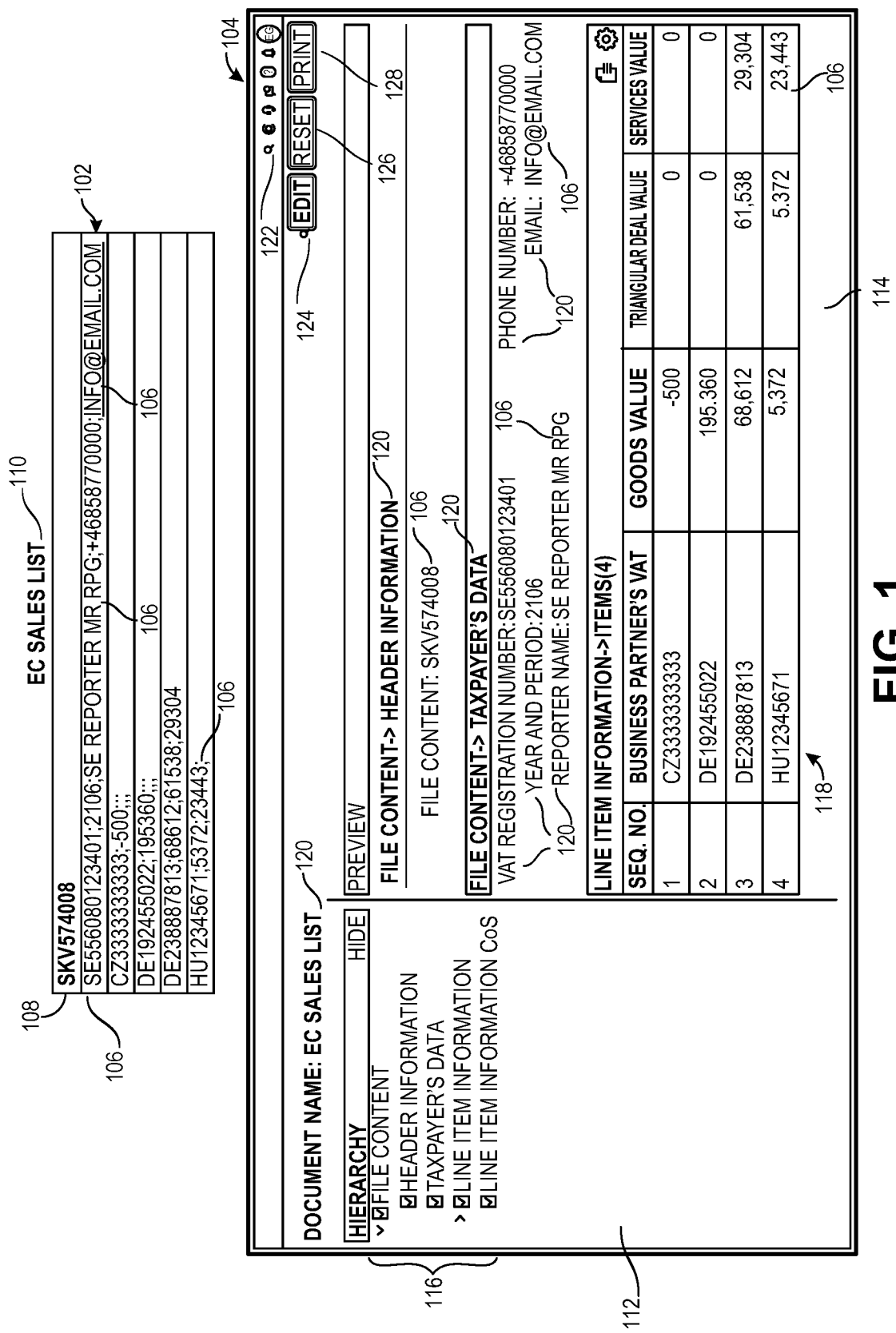
FIG. 1 illustrates a technical document and a corresponding uniform hierarchical view for displaying the technical document in a human-readable manner for some embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

Systems and methods for generating a uniform hierarchical view of technical documents irrespective of a file format of the technical documents are disclosed. In some embodiments, a harmonized view comprises any display in which data is presented in a human-readable and interpretable manner. For example, a harmonized view may comprise technical data elements extracted from the technical document along with contextual data, such as labels, for the technical data elements. The harmonized view may also present data in a hierarchical manner. In some embodiments, a technical document comprises any document that displays data in a manner that is difficult to interpret. The technical document may be a statutory report for submitting to authorities for review and may have a predefined format in which the statutory report is to be submitted. After generation of the technical document, technical data elements and technical document metadata from the technical document may be extracted. The technical data elements and the technical document metadata may be used to influence the generation of the uniform hierarchical view. In some embodiments, users can edit the technical document via the uniform hierarchical view. In some embodiments, the uniform hierarchical view is searchable. In some embodiments, an administrative user provides metadata definitions defining the technical data elements, the hierarchical structure of the technical document, mappings to source data, and other like metadata. In some embodiments, the metadata definitions are based on XSD files provided by governmental entities defining the correct format of generated technical document. In some other embodiments, metadata definitions are derived from governmental provided descriptions of correct generated technical documents.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1 illustrates an example technical document 102 and a corresponding uniform hierarchical view 104 generated based in part on technical document 102. Technical document 102 is shown as a CSV document in which technical data elements 106 are separated by semicolons. In some embodiments, technical data elements 106 for technical document 102 are extracted from an underlying application, such as an application storing payroll data for an entity. However, as described above, technical document 102 may comprise various technical file formats including, but not limited to, CSV, XML, XBRL, TXT, JSON, PDF and the like. As described above, technical documents 102 may comprise statutory reports that are required to be submitted to a presiding body (e.g., local government, IRS, etc.). The statutory reports may comprise a predefined format or syntax that technical document 102 must adhere to. In some embodiments, the predefined format is described in metadata definitions uploaded by an administrative user as will be discussed in further detail below. The metadata definitions may be provided by the administrative user prior to generating technical document 102. In some embodiments, the metadata definitions are provided in an XSD or JSON file defining technical data elements 106. For example, the metadata definitions may provide that the second row of technical document 102, the first technical data element 106 (SE556080123401) corresponds to the VAT Registration Number for the taxpayer as illustrated in uniform hierarchical view 104. Similarly for a technical document 102 submitted in JSON, a technical data element 106 would be predefined to correspond to the VAT Registration Number. As such, whether technical document 102 is in CSV, JSON, or another file format, a technical data element 106 may be defined to correspond to the VAT Registration Number, persisted during the generation of technical document 102, and displayed in uniform hierarchical view 104. In such a manner, technical documents 102 from different file formats may be displayed similarly in uniform hierarchical view 104. Likewise, the other technical data elements 106 (e.g., telephone number, email, reporter name, etc.) in technical document 102 may be similarly predefined for each technical file format for a specific statutory report in the metadata definitions.

In some embodiments, a plurality of technical documents 102 (with each document optionally comprising a different file format) may be generated based on their respective metadata definitions file and mapping of technical data elements 106 from a data source and have a uniform hierarchical view 104 for each technical document 102 generated and displayed in a uniform manner. For example, a user may upload a folder containing multiple technical documents 102 for generation of uniform hierarchical view 104. In some embodiments, users can page between technical documents 102 in uniform hierarchical view 104. In some embodiments, administrative users may upload a corresponding metadata definitions file for each technical document 102 or configure multiple technical documents 102 to adhere to a single file of metadata definitions.

Uniform hierarchical view 104 may comprise a graphical user interface generated in part from technical document 102 and displayed to a user. Uniform hierarchical view 104 may comprise technical data elements 106 associated technical document 102 as described above, along with technical document metadata determined from the metadata definitions file. For example, the technical document metadata may comprise headers 108, document title 110, and other contextual data extracted from technical document 102. Technical document metadata may also comprise a file name, a creator, a file created date, a time stamp, and the like. As described above, the technical document metadata may be determined based in part on the associated metadata definitions file. For example, the metadata definitions may define that the fourth technical data element 106 in the second row of technical document 102 represents a phone number. However, for a statutory report associated with a different metadata definitions file, the fourth technical data element 106 in the technical document 102 may represent a product code, for example. Therefore, users may save significant time by utilizing uniform hierarchical view 104 and not having to learn the specific syntax for a statutory report to understand technical document 102.

As previously mentioned, technical documents 102 may be organized hierarchically. For example, header 108 may indicate a node of the hierarchy. In some embodiments, document title 110 is the top or root node of the hierarchy for the technical document 102, headers 108 are child nodes of document title 110, and technical data elements 106 are child nodes of their corresponding headers 108. In some embodiments, headers 108 comprise the root nodes of technical documents 102. While only a single header 108 is illustrated, it should be noted that a plurality of headers 108 comprising a plurality of technical data elements 106 may be contained within a single technical document 102. In some embodiments, the metadata definitions define the hierarchy for technical document 102. For example, the metadata file may define which technical data elements 106 corresponds to a root node and which technical data elements 106 are child nodes of the root node.

In some embodiments, uniform hierarchical view 104 is separated into panes. In some embodiments, uniform hierarchical view 104 is separated into a hierarchy pane 112 and a preview pane 114. In some embodiments, uniform hierarchical view 104 is user-configurable such that users can move panes and user interface elements within uniform hierarchical view 104 to create a customized display. As shown, hierarchy pane 112 may display the various hierarchical data for technical document 102, such as nodes 116. In some embodiments, nodes 116 correspond to headers 108 in technical document 102. Nodes 116 may also correspond to technical data elements 106 having child technical data elements 106. Nodes 116 may comprise user-actuatable controls (e.g., check boxes) for viewing the corresponding technical data elements 106 in preview pane 114 for the selected node 116. For example, deselecting the node 116 for line item information may hide the corresponding preview 118 in preview pane 114. Once the user selects to view the node 116, the technical data elements 106 for the node 116 may be fetched and loaded into uniform hierarchical view 104. As will be discussed in further detail below, technical data elements 106 from technical document 102 may be cached and/or indexed and stored in a database to save processing power when generating uniform hierarchical view 104. Thus, technical documents 102 comprising large file sizes (e.g., in the gigabyte or higher range) may be efficiently displayed in the uniform hierarchical view 104. Caching data in chunks may also allow technical document 102 to be efficiently displayed in uniform hierarchical view 104 when viewed in a web browser.

Preview panel 114 may display technical data elements 106 extracted from technical documents 102. In some embodiments, preview panel 114 only displays technical data elements 106 for currently selected nodes 116 as described above. As shown, preview panel 114 may present technical data elements 106 in a contextual, understandable manner to a viewing user. To supplement technical data elements 106, preview pane 114 may comprise various contextual data 120. For example, looking at the taxpayer's data section of uniform hierarchical view 104, each of the technical data elements 106 are associated with contextual data 120 in the form of a label. Alternatively, or additionally, technical data elements 106 may be supplemented with various other contextual data 120 such as units, trends, links to related technical document elements 106, links to the technical document hierarchy, links to the metadata definitions file, and the like. In some embodiments, contextual data 120 is determined from the technical document metadata according to the metadata definitions file.

In some embodiments, technical data elements 106 in uniform hierarchical view 104 are displayed as a hyperlink. In some embodiments, technical data elements 106 having child technical data elements 106 are displayed as a hyperlink. When a user actuates the hyperlink, the child technical data elements 106 may be fetched and displayed in uniform hierarchical view 104.

Panes in uniform hierarchical view are not limited to hierarchy pane 112 or preview pane 114, and other panes may also be present in uniform hierarchical view 104. For example, a search pane may be present for searching technical document 102. Alternatively, search control 122 may bring up a search pane or a separate search window when actuated. As another example, uniform hierarchical view 104 may comprise a sidebar pane in which users can navigate between different uniform hierarchical views 104 for different technical documents 102. Uniform hierarchical view 104 may also be scrollable in some embodiments. For example, a technical document 102 may comprise a 100,000 row table. Only a subset (e.g., 100 rows) of the table may be fetched and displayed upon initial generation of uniform hierarchical view 104. In some embodiments, when generating a uniform hierarchical view 104, a top layer or top subset of layers of the hierarchy for technical document 102 initially populate uniform hierarchical view 104. In some embodiments, the metadata definitions define which fields of technical document 102 are displayed upon initial generation of uniform hierarchical view 104. To view the rest of the data, the user may scroll through the table. As the user scrolls, technical data elements 106 may be continuously fetched and displayed in uniform hierarchical view 104. Additionally, user interface elements may also be dynamically determined, created, and displayed as the user scrolls loads additional data from technical document 102 into uniform hierarchical view 104 as will be discussed in further detail below.

In some embodiments, uniform hierarchical view 104 may comprise various controls for allowing a user to make changes to uniform hierarchical view 104. For example, an edit control 124 may allow a user to make edits to technical data elements 106 in the uniform hierarchical view 104. In some embodiments, when a user edits technical data elements 106 in uniform hierarchical view 104, the edit is written to technical document 102. As such, a user may edit uniform hierarchical view 104, revert uniform hierarchical view 104 back to technical document 102 for submission, and have the edit reflected in technical document 102. In some embodiments, uniform hierarchical view 104 also comprises reset 126 for resetting any edits made. An original state of technical document 102 may be saved in a datastore or the like and be retrieved upon actuation of reset 126. In some embodiments, recent versions of technical document 102 are saved, and users can rollback a subset of the total edits without having to revert back to the original technical document 102. In some embodiments, users may use print 128 to print the current screen or the entire technical document 102. In some embodiments, uniform hierarchical view 104 may be configured to translate portions of technical document 102. For example, uniform hierarchical view 104 may translate extracted contextual data 120 to a different language.

Figure 2:
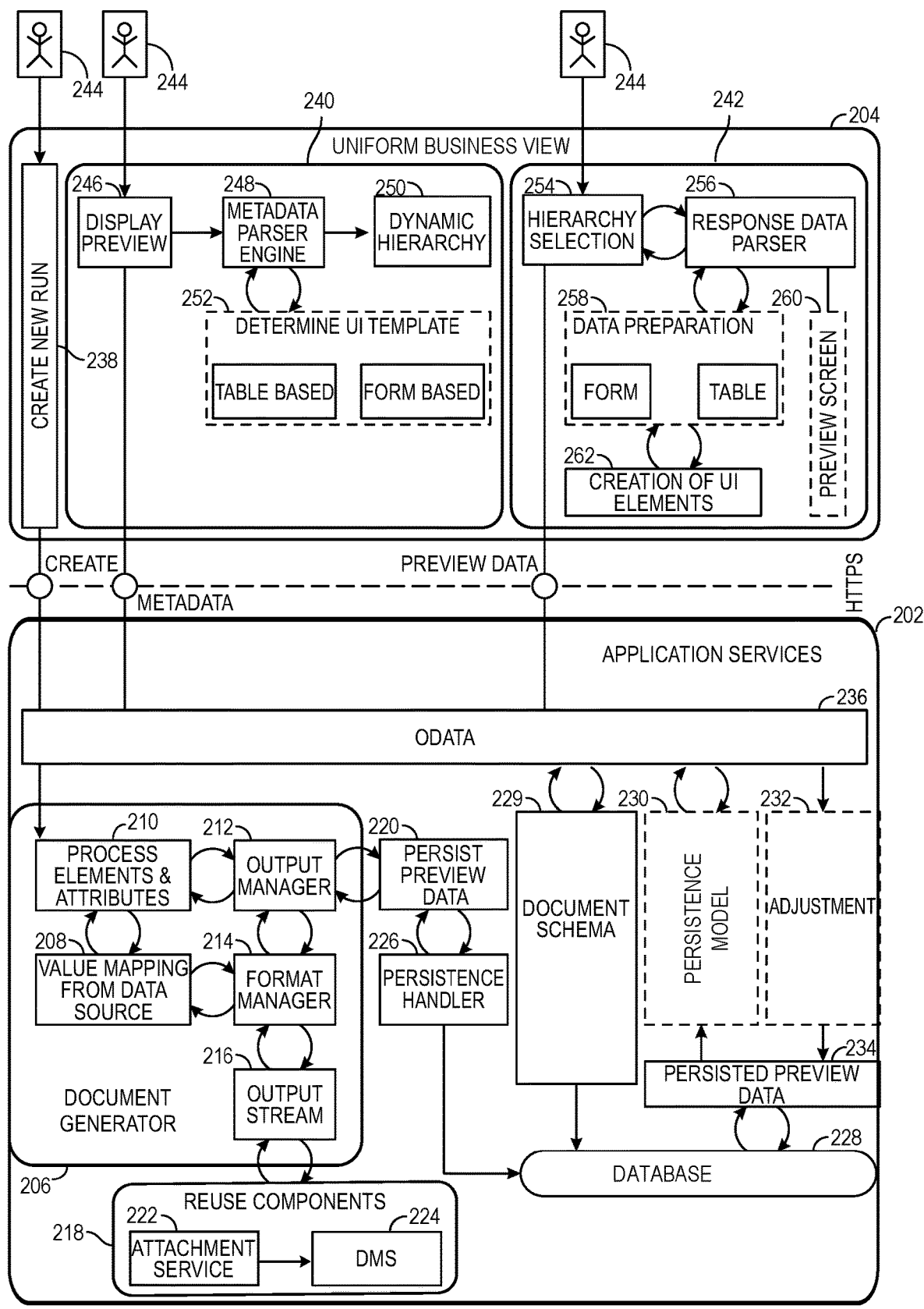
FIG. 2 illustrates a system architecture of a system for generating the uniform hierarchical view from the technical document.

FIG. 2 illustrates a document preview architecture 200 for generating uniform hierarchical view 104 for technical document 102 for some embodiments. Document preview architecture 200 may comprise application services 202 and uniform hierarchical view background 204 communicatively coupled to one another. Uniform hierarchical view background 204 may handle generation of uniform hierarchical view 104 and communicate with application services 202 to retrieve necessary data and perform background processing. In some embodiments, once metadata definitions have been imported and associated data fields have been mapped accordingly, user 244 may initiate create block 238 to begin generation of technical document 102.

Looking first at application services 202, document generator 206 may facilitate the generation of technical document 102. As described above, technical document 102 may comprise any document generated in any file format, such as XML, CSV, XBRL, TXT, JSON, PDF, and the like, and technical document 102 may be for submission of a statutory report to an authority. For example, a technical document 102 may be created detailing a company's tax information (e.g., IRS Form 941 for employment tax returns or IRS Form 720 for federal excise taxes) that must be sent to a legal authority for review. As illustrated in FIG. 1, technical documents 102 may be difficult to read and interpret by a user. Further, as described above, various reporting agencies who require the submission of technical documents 102 may have differing formats in which the technical document 102 is to be submitted. As such, two technical documents 102 submitted in the same format could contain similar numeric values but describe entirely different data. Thus, a user attempting to interpret data from technical documents 102 must also know each reporting authority's specific syntax for the report. By providing uniform hierarchical view 104 for technical document 102, users may save large amounts of time in attempting to analyze technical documents 102. Further, errors in analyzing technical documents 102 may be reduced by viewing technical document 102 in uniform hierarchical view 104.

As shown, document generator 206 may comprise a mapping engine 208, element processor 210, output manager 212, format manager 214, and output stream 216. Document generator 206 may allow a user to generate a technical document 102 and input technical data elements 106 for the technical document. Mapping engine 208 may map technical data elements 106 from database 228 to technical document 102 whereby technical data elements 106 may be persisted for use in uniform hierarchical view 104. For example, mapping engine 208 may map each technical data element 106 to a specific position in the interface of uniform hierarchical view 104. Mapping engine 208 may map technical data elements 106 based on the metadata file. In some embodiments, mapping engine 208 is configured to map underlying application data according to the metadata definitions. For example, an application may comprise payroll data which may be mapped according to the metadata definitions for generating a payroll sheet to be submitted to a particular tax authority. Mapping engine 208 may also map technical data elements 106 to UI elements, such as a table. Additionally, or alternatively, mapping engine 208 may map technical data elements 106 to technical document metadata, such as contextual data 120. Mapping engine 208 may then communicate with element processor 210 to process the mapped technical data elements 106. In some embodiments, element processor 210 processes technical data elements 106 and attributes for technical document 102. Technical document 102 attributes may comprise various properties of the technical document 102 such as, document title 110, document author, document type, sensitivity, and document status. The document type attribute may define constraints for technical document 102, such as usage restrictions for technical document 102. In some embodiments, a document status attribute indicates whether technical document 102 is ready to be submitted and/or whether the technical document 102 must be digitally signed before submission. The sensitivity attribute for technical document 102 may define a classification level for technical document 102 such that classified information can be protected.

Once processed, element processor 210, may communicate with output manager 212 to output the processed technical data elements 106 and attributes to format manager 214. Format manager 214 may apply any necessary formatting to the technical data elements 106. For example, format manager 214 may round a technical data element 106 having greater than three decimal places. As another example, format manager 214 may format a phone number technical data element 106 such that is presented in a more readable manner in uniform hierarchical view 104. Format manager 214 may also perform translation of technical document 102. Format manager 214 may communicate with output stream 216. Output stream 216 may determine which technical data elements 106 are to be sent to reuse components 218 and/or which technical data elements 106 are to be sent to persistency preview 220. In some embodiments, if output stream 216 determines a technical data element 106 should be sent to persistency preview 220, the technical data element 106 is passed back through format manager 214 (and reformatted if necessary), to output manager 212, and then to persistency preview 220 as illustrated. In some embodiments, persistency preview 220 persists technical data elements 106 for later use in uniform hierarchical view 104. In some embodiments, output manager 212, format manager 214, and output stream 216 run in parallel to distribute technical data elements 106 correctly and efficiently within document preview architecture 200.

Reuse components 218 may persist technical data elements 106 and/or technical document 102 once generated for later use in uniform hierarchical view 104. As illustrated, reuse components 218 may comprise an attachment service 222 coupled to a document management system (DMS) 224. Attachment service 222 may be used to upload, download, check in, check out, rename, delete, or edit attachments in DMS 224. DMS 224 may be configured to receive, track, manage, and store all technical documents 102 generated via document generator 206. DMS 224 may store various technical document metadata for technical documents 102 and the metadata definitions by way of metadata definition files. Example technical document metadata includes, but is not limited to, a creator, a created-on date, a file type, a file size, a file name, and the like. In some embodiments, DMS 224 stores technical document 102 and/or metadata definitions files are stored in DMS 224.

As described above, output manager 212 may communicate data to persist preview 220. Persist preview 220 may then pass the data to persistence handler 226. Persistence handler 226 may in turn pass the data to database 228 for storage. In some embodiments, the data passed from persistence handler 226 to database 228 is stored in a persistence layer of database 228. In such a manner, data originating from various file formats may be more efficiently handled by document preview architecture 200. In some embodiments, the persistence layer allows for object-relational mapping to map data objects to relational data.

Application services 202 may also comprise a document schema 229 along with a persistence model 230 and adjustment handler 232 coupled to a persisted preview data handler 234. Persisted preview data handler 234 may be coupled to database 228 as shown. Each of document generator 206, document schema 229, the persistence model 230, and the adjustment handler 232 may be coupled to OData layer 236 as shown. In some embodiments, document schema 229 serves as the metadata definitions file for mapping technical data elements for technical document 102.

In some embodiments, persistence model 230 may serve as a data modeling infrastructure for generating data models comprising semantic information used in generating uniform hierarchical view 104. Persistence model 230 may comprise objects such as tables, views, and structured types. In some embodiments, persistence model 230 comprises various artifacts that are design-time definition used to generate run-time objects when generating uniform hierarchical view 104. In some embodiments, the artifacts comprise the data tables (if present) in uniform hierarchical view 104.

In some embodiments, OData layer 236 pushes data to adjustment handler 232 which is then communicated to persisted preview data handler 234. Adjustment handler is configured to write edits from user 244 to technical document 102 and/or database 228 when user 244 edits technical data elements 106 in uniform hierarchical view 104.

Looking now at uniform hierarchical view background 204, as illustrated, uniform hierarchical view background 204 may comprise a create block 238, a metadata block 240, and a data preview block 242. Uniform hierarchical view background 204 may be administered by one or more users 244 as shown. In some embodiments, multiple users 244 handle different parts of uniform hierarchical view background 204. In some embodiments, uniform hierarchical view background 204 is configured to function automatically with no actions performed by users 244. In some embodiments, users 244 are admin users 244 authorized to configure various settings for uniform hierarchical view background 204, and, once the settings are initialized, uniform hierarchical view background 204 may be configured to run automatically to generate user interfaces for technical documents 102.

In some embodiments, create block 238 initializes document generator 206. In some embodiments, user 244 uploads and/or generates one or more technical documents 102 and initializes the creation of uniform hierarchical views 104 for the technical documents 102 via create block 238. In some embodiments, create block 238 is embodied as a user-actuatable button on uniform hierarchical view 104 or may be actuated via a command line prompt or other human-machine interface actuation. In some embodiments, user 244 uploads metadata definitions for the corresponding technical document 102 prior to using create block 238 to generate technical documents 102.

Metadata block 240 may comprise a display preview 246, metadata parser 248, dynamic hierarchy 250, and UI template 252 as shown. Metadata block 240 may receive technical document metadata and/or the metadata file from OData layer 236 at display preview 246. Display preview 246 may pass technical document metadata to metadata parser 248 whereby the technical document metadata is parsed. In some embodiments, a UI template 252 is determined based in part on the received and parsed metadata from metadata parser 248. As shown, UI template 252 may determine if uniform hierarchical view 104 should be generated to be table based, form based, or a combination thereof. In some embodiments, forms in uniform hierarchical view 104 serve as a container for other user interface elements of uniform hierarchical view 104. For example, a form may comprise labels, input fields, check boxes, sliders, toggles, or any combination thereof. In some embodiments, a form contains form elements with each form element comprising a label and input box. Thus, for example, each technical data element 106 (i.e., the input box) and its corresponding contextual data 120 (i.e., the label) may comprise a form element. As an example, and looking at FIG. 1, the Taxpayer's Data portion of uniform hierarchical view 104 may be considered to be a form, while each contextual data 120 and its corresponding technical data element 106 may be considered to be a form element.

In some embodiments, technical data elements 106 comprising repeating child technical data elements 106 are displayed as a table. For example, looking at the table displayed in preview 118 in FIG. 1, the Business Partner's VAT column comprises four child technical data elements 106 with each child technical data element 106 defining a distinct Business Partner's VAT. As such these repeating child technical data elements 106 may be displayed in a tabular form element in uniform hierarchical view. In some embodiments, the table is displayed as a tree table to illustrate the hierarchical relationship of technical document 102. In some embodiments, displaying technical data elements 106 as a table is determined based in part off the technical metadata extracted from technical document 102. In some embodiments, technical data elements 106 with no child elements are displayed as a form. Once parsed, metadata parser 248 may send the metadata to dynamic hierarchy 250 for generation of the hierarchy as illustrated with respect to nodes 116 in uniform hierarchical view 104.

As shown, data preview block 242 may comprise hierarchy selection 254, response data parser 256, data preparation 258, dynamic UI creator 262, and preview screen 260 in some embodiments. Data preview block 242 may handle all inputs to uniform hierarchical view 104 as user 244 is viewing uniform hierarchical view 104. For example, hierarchy selection 254 may receive selections of node 116 and update uniform hierarchical view 104 accordingly. Hierarchy selection 254 may then transmit the selected node 116 to response data parser 256 for data parsing. Data parser 256 may then transmit the parsed data to data preparation 258. In some embodiments, data preparation 258 is responsible for preparing data stored in database 228 that is not currently present on uniform hierarchical view 104. As briefly described above, data not currently viewable in uniform hierarchical view 104 may instead be cached to save processing power and decrease response times for document preview architecture 200. Once user 244 requests to view a different node 116 in the hierarchy, data preparation 258 may fetch the required technical data elements 106 from database 228. Once fetched, the technical data elements 106 may be processed at data preparation 258. Dynamic UI creator 262 may also dynamically generate the necessary UI elements for the fetched technical data elements 106. For example, for tabular data, dynamic UI creator 262 may generate a table for display in uniform hierarchical view 104 such that technical data elements 106 are presented in an understandable, tabular manner. Dynamic UI creator 262 may also fetch checkboxes, labels, sliders, toggles, and the like for generating form elements for fetched technical data elements 106. In some embodiments, uniform hierarchical view 104 may comprise UI elements such as graphs, charts, dialog boxes, buttons, drop down boxes, lists, comments, and the like. Once dynamic UI creator 262 and data preparation 258 have fetched technical data elements 106 and created the requested UI elements, uniform hierarchical view 104 may update at preview screen 260 to display the updated uniform hierarchical view with the fetched technical data elements 106.

Figure 3:
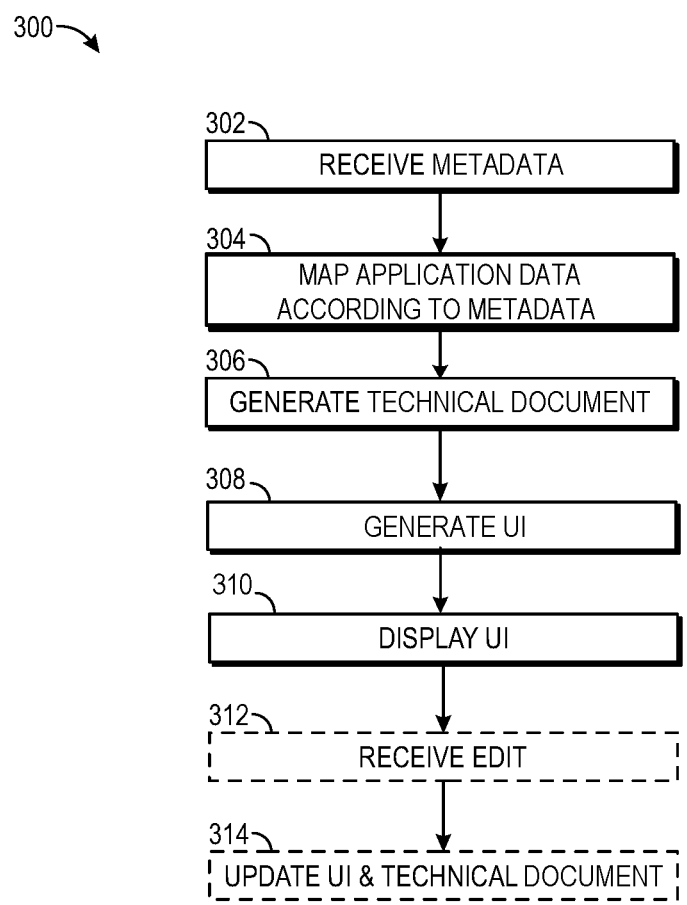
FIG. 3 illustrates an exemplary flow chart for generating the uniform hierarchical view of a technical document.

FIG. 3 illustrates an exemplary method 300 for generating a uniform hierarchical view 104 from a technical document 102 for some embodiments. At step 302, metadata may be received and stored. As described above, the metadata may be received as an XSD document, a JSON file, or the like. The metadata may define the mapping of technical data elements 106 to the various UI elements in uniform hierarchical view 104, along with mapping of technical data elements 106 from database 228 as described above. The metadata definitions may also define which data labels for the technical data elements 106, such as the "SE Reporter Mr RPG" technical data elements 106 illustrated in FIG. 1 defining the reporter's name. In some embodiments, a metadata definitions file is stored in database 228 or a relational mapping database connected to system architecture 200. As described above, the metadata definitions file may also define the hierarchy of technical document 102. Once received, system architecture 200 may parse and store the metadata for mapping to technical data elements 106.

At step 304, application data may be mapped according to the metadata definitions file. The application data may comprise the technical data elements 106 used for generating technical document 102. In some embodiments, the application data is stored in database 228. For example, for generating a payroll sheet, database 228 may be queried and all technical data elements 106 needed to generate the payroll sheet (as defined by the metadata definitions) may be mapped. In some embodiments, the mapping comprises mapping technical data elements 106 to data labels, UI elements, nodes in the hierarchy, or a combination thereof. In some embodiments, the mapping is provided to metadata block 240 and/or data preview block 242 for generating uniform hierarchical view 104.

Next, at step 306, technical document 102 may be generated within system architecture 200. In some embodiments, data may be extracted and stored for generating technical document 102. In some embodiments, the data is extracted from the application data. In some embodiments, technical data elements 106 are queried using mapping information from technical data elements 106 determined at step 304. In some embodiments, the query is a query of database 228 such as an SQL query. In some embodiments, the queries are persisted for later use in uniform hierarchical view 104. In some embodiments, technical data elements 106 and/or technical document metadata for technical document 102 is extracted and stored in at least one of reuse components 218 or database 228. In some embodiments, technical data elements 106 are stored in a persistency layer of database 228 for later use in generating uniform hierarchical view 104. In some embodiments, technical data elements 106 and/or technical document 102 metadata is cached or indexed within database 228.

As previously mentioned, technical documents 102 may comprise various statutory reports required for taxpayers to submit to tax or other statutory authorities. Each statutory authority may have different standards or layouts in which technical documents 102 are generated and transmitted. Thus, it may be difficult for a user 244 to interpret technical data elements 106 efficiently and accurately from technical documents 102. As described above, technical documents 102 may be generated via create block 238. In some embodiments, technical documents 102 may be generated based on data stored in database 228 or another external database and generated in various technical file formats.

At step 308, uniform hierarchical view 104 may be generated for the technical document 102. In some embodiments, uniform hierarchical view 104 is further generated based in part on the specific file format. For example, a uniform hierarchical view 104 for an XML technical document 102 may be displayed differently than a uniform hierarchical view 104 for a CSV technical document 102. In some embodiments, the generation of uniform hierarchical view is also dependent upon the specific statutory report as defined by the metadata definitions. For example, a technical document 102 for IRS form 941 may be displayed differently in uniform hierarchical view 104 than a technical document for IRS form 720. In some embodiments, the statutory report influences the display of technical data element 106 and the file format of technical document 102 does not affect the display of uniform hierarchical view 104.

Once uniform hierarchical view 104 is created, uniform hierarchical view 104 may be displayed to the user for viewing at step 310. As described above, uniform hierarchical view 104 may comprise a graphical user interface and be split into hierarchy pane 112 and preview pane 114. Technical data element 106 may be presented in a hierarchical manner. In some embodiments, uniform hierarchical view 104 is initially generated to show a top level of the hierarchy. Initially displaying the top level of the hierarchy may allow for more efficient processing of technical document 102 and allow for users 244 to quickly navigate to their desired hierarchical node of technical document 102. Users 244 may select various nodes 116 in hierarchy pane 112 to view the technical data element 106 for the selected node 116. Once a node 116 is selected, the technical data element 106 may be fetched from database 228 and displayed in uniform hierarchical view 104. In some embodiments, technical document 102 is displayed in a scrollable manner that allows users 244 to view large amounts of data without having to search for specific technical data element 106.

Next, at optional step 312, an edit may be received via uniform hierarchical view 104. As briefly described above, users 244 may edit technical data elements 106 in uniform hierarchical view 104 and have the edit reflected in technical document 102. Lastly, at optional step 314, in response to receiving an edit, uniform hierarchical view 104 and technical document 102 may be updated to reflect the edit. In some embodiments, edits are written to database 228. In some embodiments, edits are written directly to technical document 102. Edits may also be logged by document preview architecture 200 and stored in database 228. In some embodiments, edit logs comprise at least one of an editing user 244, a time stamp, an original value, or a new value. In some embodiments, uniform hierarchical view 104 also comprises a reset button to reset uniform hierarchical view 104 (and technical document 102) to an original state after edits have been received.

Figure 4:
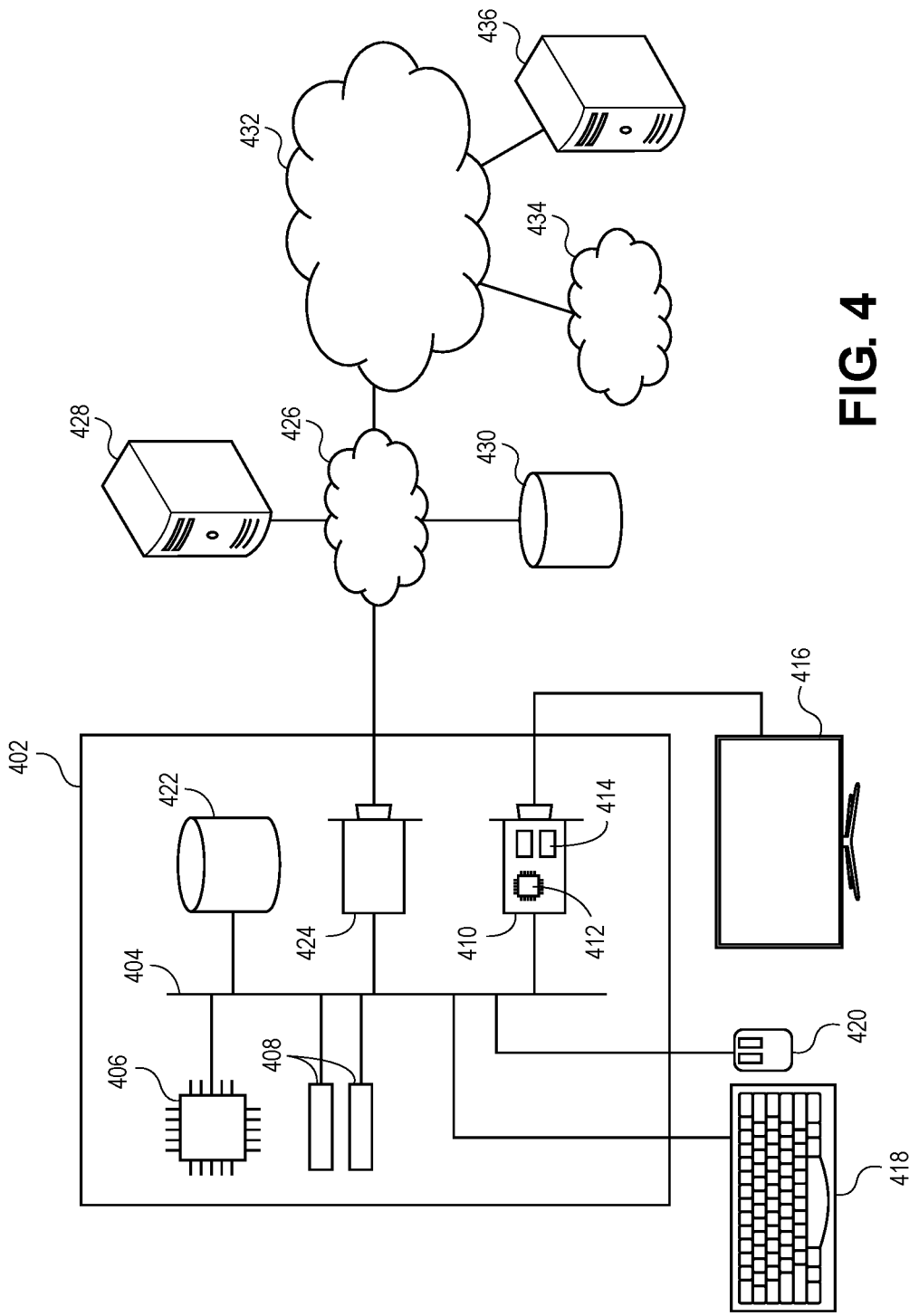
FIG. 4 depicts an exemplary hardware platform for certain embodiments.

Turning now to FIG. 4, in which an exemplary hardware platform for certain embodiments is depicted. Computer 402 can be a desktop computer, a laptop computer, a server computer, a mobile device such as a smartphone or tablet, or any other form factor of general- or special-purpose computing device containing at least one processor. Depicted with computer 402 are several components, for illustrative purposes. In some embodiments, certain components may be arranged differently or absent. Additional components may also be present. Included in computer 402 is system bus 404, via which other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also, on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, such as non-transitory computer readable media, and may be internally installed in computer 402 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the Institute of Electrical and Electronics Engineers (IEEE) 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over public Internet 432. Local network 426 is in turn connected to public Internet 432, which connects many networks such as local network 426, remote network 434 or directly attached computers such as computer 436. In some embodiments, computer 402 can itself be directly connected to public Internet 432.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of generating uniform hierarchical views of one or more technical documents, the method comprising:
   receiving metadata definitions, the metadata definitions defining application data elements and technical document hierarchies for a plurality of technical documents;
   mapping, based on a first metadata definition, a plurality of application data elements from a database to a first technical document;
   mapping, based on a second metadata definition, the plurality of application data elements from the database to a second technical document, wherein the first and second technical documents have different formats and at least a portion of same application data elements;
   generating the first and second technical documents, the first and second technical documents comprising the application data elements;
   generating a first uniform hierarchical view for the first technical document, the first uniform hierarchical view based in part on the first technical document and the first metadata definition;
   populating the first uniform hierarchical view with at least a subset of technical data elements from the first technical document; and
   causing display of the first uniform hierarchical view;
   generating a second uniform hierarchical view for the second technical document, the second uniform hierarchical view based in part on second technical document and the second metadata definition; and
   causing display of the second uniform hierarchical view, wherein the first and second technical documents in the different file formats are displayed in a uniform manner between the first uniform hierarchical view and the second uniform hierarchical view.

2. The method of claim 1, wherein the method further comprises:
   displaying a parent node of the plurality of application data elements as a hyperlink in the uniform hierarchical views;
   receiving actuation of the hyperlink; and
   updating the uniform hierarchical views to display at least one child node of the parent node.

3. The method of claim 1, wherein the method further comprises:
   storing the plurality of application data elements and the metadata definitions in the database,
   wherein the metadata definitions are stored in a persistence layer of the database.

4. The method of claim 3, wherein the method further comprises:
   receiving a selection of a node of a first technical document hierarchy displayed in the first or second uniform hierarchical views;
   fetching, from the database, the plurality of application data elements associated with the nodes of the first technical document hierarchy; and
   updating the first or second uniform hierarchical views to display the plurality of application data elements associated with the node of the first technical document hierarchy.

5. The method of claim 1, wherein the method further comprises:
   receiving an edit to an application data element in the first or second uniform hierarchical views; and
   converting the first or second uniform hierarchical views back to the corresponding first or second technical documents, the corresponding first or second technical documents comprising the edit to the technical data elements.

6. The method of claim 1, wherein the first and second technical documents are associated with a statutory report, the statutory report comprising the metadata definitions.

7. The method of claim 1, wherein the first uniform hierarchical view and the second uniform hierarchical view both include tables and forms.

8. One or more non-transitory computer-readable media storing computer-executable instructions that, when executed by a processor, perform a method of creating uniform hierarchical views of one or more technical documents, the method comprising:
   receiving metadata definitions, the metadata definitions defining application data elements and technical document hierarchies for a plurality of technical documents;
   mapping, based on a first metadata definition, a plurality of application data elements from a database to a first technical document;
   mapping, based on a second metadata definition, the plurality of application data elements from the database to a second technical document, wherein the first and second technical documents have different formats and at least a portion of same application data elements;
   generating the first and second technical documents, the first and second technical documents comprising the application data elements;
   generating a first uniform hierarchical view for the first technical document, the first uniform hierarchical view based in part on the first technical document and the first metadata definition;
   populating the first uniform hierarchical view with at least a subset of technical data elements from the first technical document; and
   causing display of the first uniform hierarchical view;
   generating a second uniform hierarchical view for the second technical document, the second uniform hierarchical view based in part on second technical document and the second metadata definition; and causing display of the second uniform hierarchical view, wherein the first and second technical documents in the different file formats are displayed in a uniform manner between the first uniform hierarchical view and the second uniform hierarchical view.

9. The media of claim 8, further comprising:
receiving an edit to an application data element of the subset of application date elements in the first uniform hierarchical view; and
updating the first uniform hierarchical view to display the edit to the application data element.

10. The media of claim 9, wherein the method further comprises:
creating a log for the edit, the log comprising at least one of an editing user, an old value for the application data element, a new value for the application data element, or a time of the edit.

11. The media of claim 9, further comprising writing the edit to the application data element in the first uniform hierarchical view to the first technical document.

12. The media of claim 11, further comprising:
receiving an actuation of a reset control in the first uniform hierarchical view; and
in response to receiving the actuation of the reset control, reverting the first uniform hierarchical view and the first technical document to undo the edit to the application data element.

13. The media of claim 8,
wherein at least a portion of the application data elements are hierarchically structured, and
wherein the method further comprises:
determining a hierarchy for the at least a portion of the application data elements based on the metadata definitions; and
displaying, in the first uniform hierarchical view, the application data elements according to the hierarchy.

14. The media of claim 13, wherein the method further comprises:
generating at least one user interface element for the first uniform hierarchical view, the at least one user interface element based in part on the hierarchy for the application data elements.

15. A system for generating uniform hierarchical views of one or more technical documents, comprising:
a database;
a processor; and
one or more non-transitory computer-readable media storing computer-executable instructions that, when executed by the processor, perform a method of creating uniform hierarchical views of one or more technical documents, the method comprising:
receiving metadata definitions, the metadata definitions defining application data elements and technical document hierarchies for a plurality of technical documents;
mapping, based on a first metadata definition, a plurality of application data elements from a database to a first technical document;
mapping, based on a second metadata definition, the plurality of application data elements from the database to a second technical document, wherein the first and second technical documents have different formats and at least a portion of same application data elements;
generating the first and second technical documents, the first and second technical documents comprising the application data elements;
generating a first uniform hierarchical view for the first technical document, the first uniform hierarchical view based in part on the first technical document and the first metadata definition;
populating the first uniform hierarchical view with a subset of technical data elements from the first technical document; and
causing display of the first uniform hierarchical view;
generating a second uniform hierarchical view for the second technical document, the second uniform hierarchical view based in part on second technical document and the second metadata definition; and
causing display of the second uniform hierarchical view, wherein the first and second technical documents in the different file formats are displayed in a uniform manner between the first uniform hierarchical view and the second uniform hierarchical view.

16. The system of claim 15, wherein the uniform hierarchical views comprises a first pane and a second pane, wherein the first pane displays hierarchical information from a corresponding technical document, and wherein the second pane displays the subset of the application data elements from the corresponding technical document.

17. The system of claim 15, wherein a application data element comprising at least one repeating child application data element is displayed in a table in the uniform hierarchical views, and wherein a application data element comprising no child application data elements is displayed in a form in the uniform hierarchical views, the form comprising the application data element and a label for the application data element.

18. The system of claim 15, wherein the method further comprises:
receiving a search for an application data element from the first technical document for display in the first uniform hierarchical view;
fetching the searched application data element from the database;
dynamically generating at least one user interface element for the first uniform hierarchical view, the at least one user interface element based in part on the searched application data element; and
causing the display of the first uniform hierarchical view comprising the searched application data element and the at least one user interface element.

19. The system of claim 15, wherein the uniform hierarchical views comprise contextual data for the application data elements, the contextual data based on the metadata definitions.

20. The system of claim 15, wherein the metadata definitions comprises at least one of a file name, a header name, or an associated statutory report.

* * * * *